United States Patent
Qin et al.

(10) Patent No.: US 10,572,936 B2
(45) Date of Patent: Feb. 25, 2020

(54) COMMERCE PAYMENT RECONCILIATION SYSTEM

(71) Applicant: Microsoft Technology Licensing, LLC, Redmond, WA (US)

(72) Inventors: Mian Qin, Bothell, WA (US); Rohitha Hewawasam, Redmond, WA (US); Ivan Petrov Trindev, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 573 days.

(21) Appl. No.: 15/260,419

(22) Filed: Sep. 9, 2016

(65) Prior Publication Data
US 2018/0075525 A1    Mar. 15, 2018

(51) Int. Cl.
*G06Q 40/02*     (2012.01)
*G06Q 20/10*     (2012.01)

(52) U.S. Cl.
CPC .......... *G06Q 40/02* (2013.01); *G06Q 20/102* (2013.01)

(58) Field of Classification Search
CPC ......... G06Q 40/02; G06Q 40/12; G06Q 40/00
See application file for complete search history.

(56) References Cited

U.S. PATENT DOCUMENTS

| | | | |
|---|---|---|---|
| 6,216,169 B1 | 4/2001 | Booman et al. | |
| 8,521,634 B1 | 8/2013 | Pathak et al. | |
| 8,694,393 B2 | 4/2014 | Lobana et al. | |
| 2001/0034704 A1 | 10/2001 | Farhat et al. | |

(Continued)

FOREIGN PATENT DOCUMENTS

| | | |
|---|---|---|
| CN | 104462568 A | 3/2015 |
| WO | 0219229 A2 | 3/2002 |

OTHER PUBLICATIONS

Daniel Peng and Frank Dabek, Large-scale Incremental Processing Using Distributed Transactions and Notifications, Google, Inc.*

(Continued)

*Primary Examiner* — Hao Fu
(74) *Attorney, Agent, or Firm* — Rainier Patents, P.S.

(57) ABSTRACT

Described herein are various technologies pertaining to reconciling financial transaction information. A system for reconciling financial transactions can utilize incremental processing. Normalized financial data can be processed with submitted financial data identifiable from data derived from submitted financial data. A pluggable framework can utilize payment provider specific configuration data, a plugin model that provides information regarding a syntactic structure of financial data, and a plugin reader that provides semantic information regarding financial data. A distributed computation platform can utilize distributed computational units to utilize dynamic programming to derive a balance for particular accounts. Results from the distributed computational units are reduced into a point-in-time report. A first data version and a second data version from a particular payment provider can be retrieved. These data versions can be simultaneously maintained and accessible by a data consumer. Changes between the versions can be identified and provided to the data consumer.

20 Claims, 12 Drawing Sheets

(56) References Cited

U.S. PATENT DOCUMENTS

| | | | |
|---|---|---|---|
| 2002/0072975 A1* | 6/2002 | Steele | G06Q 20/10 |
| | | | 705/14.1 |
| 2003/0018550 A1 | 1/2003 | Rotman et al. | |
| 2005/0187852 A1 | 8/2005 | Hwang | |
| 2006/0282474 A1* | 12/2006 | MacKinnon, Jr. | G06F 9/52 |
| 2007/0288336 A1 | 12/2007 | Malaviya et al. | |
| 2009/0070237 A1 | 3/2009 | Lew et al. | |
| 2013/0211978 A1 | 8/2013 | Lazo | |
| 2014/0310136 A1 | 10/2014 | Cvetkovski | |
| 2015/0227629 A1 | 8/2015 | Klensch | |
| 2017/0177737 A9* | 6/2017 | Hu | G06N 5/022 |

OTHER PUBLICATIONS

"Enterprise Data Warehouse Data Reconciliation Methodology", Published on: Mar. 17, 2015 Available at: https://dwbi.org/data-modelling/dw-design/10-data-reconciliation, 4 pages.

"Financial Service Firms Find Value in APIs", Published on: Oct. 19, 2015 Available at: http://www.mulesoft.com/resources/api/api-strategy-financial-services, 5 pages.

* cited by examiner

FIG. 5

| SET CUR. 520 | SUBMISSION DATE 530 | SUB. AMT 540 | SUB. CUR. 550 | FEE AMOUNT 580 | FEE CURR. 560 | ADVICE METADATA 570 |
|---|---|---|---|---|---|---|
| SGD | 10/11/2015 12:00:00 AM | 9 | AUD | -0.35161849710982658953757225 | SGC | {"TRANACTIONID": "2E816671MH0024923"} |

510

COMMERCE PAYMENT RECONCILIATION SYSTEM

BACKGROUND

The electronic processing of financial transactions can be a daunting, resource-intensive computing problem. More specifically, reconciling transaction information from multiple sources, related to transactions in different currencies in geographically distinct locations can be extremely complex. Reports are generated based on transaction information from one or more sources of electronic processing. The process of reconciliation can further be complicated by inaccuracy(ies) of records supplied from these source(s). For example, when initially reported, the records can be less than completely, with update(s) provided to be applied to correct previously reported records.

SUMMARY

Described herein is a system for reconciling financial transactions using incremental processing. The system receives incremental changes of transaction information retained by a payment service. The system utilizes a remainder of a previous incremental reconciliation process, if any, processing the received incremental changes against a base data comprising settlement information received from a payment provider (e.g., credit card transaction processor) by identifying settled transactions and a new remainder of the previous incremental reconciliation process.

Also described herein is an extensible payment service system comprising a download configuration component configured to store configuration data (e.g., setting(s) and credential(s)) to be used for retrieving raw financial data from a particular payment provider. The extensible payment service system allows plugins for adding a payment provider to the system, specifically, a plugin model for downloading financial data file(s) and syntactically parsing the downloaded financial data file(s), and reader plugin(s) for reading data from these files and then mapping records in the payment provider format to a format that the system understands.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 5 illustrated an exemplary user interface illustrating a settlement information record.

DETAILED DESCRIPTION

Figure 1:
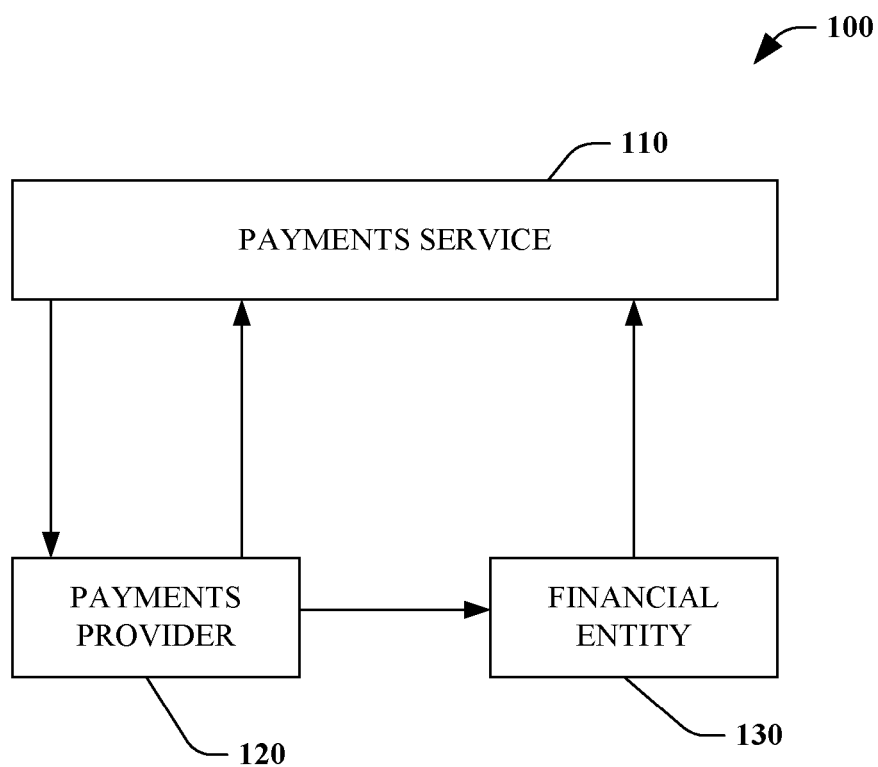
FIG. 1 is a functional block diagram that illustrates a financial transaction reconciliation overview system.

Various technologies pertaining to commerce payment reconciliation are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding commerce payment reconciliation. What follows are one or more exemplary systems and methods.

Aspects of the subject disclosure pertain to the technical problem of reconciling financial transaction information. For example, from a payment service's perspective, reconciling stored transaction information with settlement information provided by a payment provider and/or reconciling stored transaction information with financial information provided by a financial entity (e.g., bank). The technical features associated with addressing this problem involve using an incremental processing technique to settle transactions. Accordingly, aspects of these technical features exhibit technical effects of more efficiently and effectively settling financial transactions.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Transaction Reconciliation Overview

Referring to FIG. 1, a financial transaction reconciliation overview system 100 is illustrated. The system 100 illustrates a simplified view of the complex system by which a payment service 110 (e.g., merchant, service, etc.) can reconcile transaction information (e.g., credit card transaction) over a specified period of time. The payment service 110 submits transaction information (e.g., credit card transactions) to a payment provider 120 (e.g., credit card transaction processor) and retains a copy of the submitted transaction information. Periodically, the payment provider 120 provides settlement information (e.g., at the transaction level) to the payment service 110. The settlement information can include, for example, for a particular transaction, a settlement amount for the transaction, a foreign currency in which the transaction was settled, an exchange rate utilized for the transaction, and the like.

Periodically, the payment provider 120 further provides deposit information corresponding to the settlement information to a financial entity 130 (e.g., provides cash deposit to a bank account of the payment service 110). Thereafter, the financial entity 130 provides aggregated deposit information (e.g., bank statements), to the payment service 110, advising the payment service 110 of deposit(s) made on behalf of the payment service 110 by the payment provider 120.

In order to confirm that the payment service 110 has been compensated appropriately, the payment service 110 can reconcile the retained copy of the submitted transaction information with the periodically submitted settlement information, to arrive at a settlement reconciliation dataset. The settlement reconciliation dataset can be reconciled with the aggregated deposit information received from the financial entity, to determine a cash reconciliation dataset.

The financial transaction reconciliation overview system 100 illustrated in FIG. 1 is simplified to assist in explanation of actors and the flow of information between actors in a financial transaction. The number of transactions supported by a particular payment service can reach into the millions on a daily basis and the number of different payment providers is ever increasing. To add further complexity, each payment provider potentially has differing formats for information, different information submitted and on varying submission frequencies. Thus, reconciliation of financial transaction information can be a resource-intensive computing problem.

In order to decrease consumption of computing resources, increase flexibility of the use of information generated by financial transaction reconciliation and decrease development time to add additional payment provider(s), the following aspects will be discussed:

(1) Incremental processing for large financial data reconciliation;
(2) Lossless derivation in financial data normalization;
(3) Plug-in model for onboarding additional payment provider(s);
(4) Map-reduce for point-in-time report generation; and
(5) Versioning in continuous delivery of financial data.

1. Incremental Processing for Large Financial Data Reconciliation

With millions of transactions occurring daily, comparing transaction information from two different perspectives (e.g., payment service and payment provider perspectives and/or payment service and financial entity perspectives) can be an extremely complex and computing resource-intensive endeavor. Joins would need to be performed on entire datasets on a regular basis. Performing joins on transactions for a single day may be computationally acceptable. However, performing joins for transaction for longer periods of time (e.g., months or even years) are less computationally desirable. Thus, with ever increasing datasets, computational resources required to perform joins can be potentially prohibitive.

For example, reconciling transaction information retained by a first party (e.g., the payment service 110) with settlement information obtained from a second party (e.g., the payment provider 120) can be extremely time-consuming. To complicate matters further, data can arrive from the first party and the second party at different times and/or at different rates.

These full dataset joins of immense transaction-level data can be computationally inefficient. Additionally, in order to track historical reconciliation status, regular full dataset joins can lead to large storage space consumption (e.g., hundreds of gigabytes for each run). Further, identifying a changed part between reconciliation results can be difficult as it would be necessary to compare data feeds (e.g., of hundreds of gigabytes) each time the changes in the reconciliations result are needed.

Figure 2:
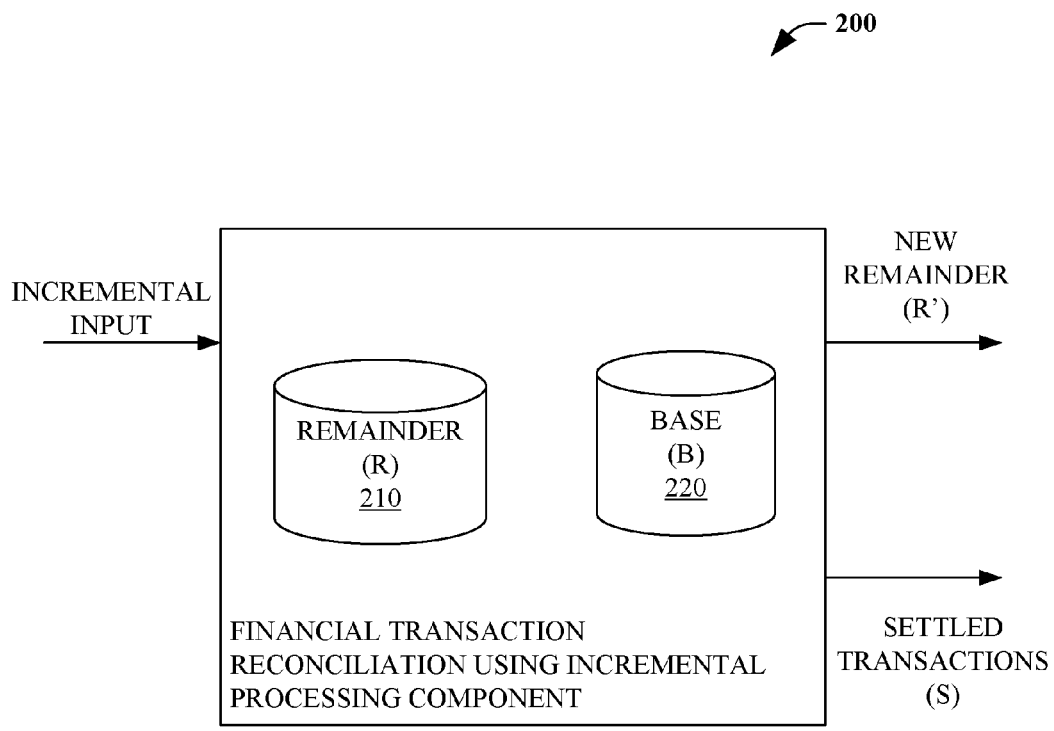
FIG. 2 is a functional block diagram of a system for reconciling financial transactions using incremental processing.

Referring to FIG. 2, a system for reconciling financial transactions using incremental processing 200 is illustrated. Recognizing that input to financial reconciliation is generally incremental (e.g., transactions occurring during a specific time period, transactions settled during a specific time period, etc.), once initialized, the system 200 processes only the incremental changes. Starting with a remainder (R) 210 of a previous incremental reconciliation process (e.g., initially null), the system 200 can process the received incremental changes @Input) (e.g., transaction information retained by payment service) against base data (B) 220 upon which reconciliation is desired (e.g., settlement information received from payment provider). The system can identify a latest result (S) (e.g., settled transactions) and a new remainder (R') (e.g., unreconciled transactions), for use, in a next iteration of incremental processing of the system 200 (e.g., as (R) 210 for the next iteration of incremental processing). Processing of the system 200 can be set forth in equation form in Equation 1 as follows:

$$(\delta Input+R) \times B = S+R' \qquad \text{(Equation 1)}$$

Where:
  δInput is the incremental input (e.g., transaction information retained by payment service),
  R is the previous remainder (e.g., initially set to null),
  R' is the new remainder (e.g., unreconciled transactions),
  S is the result of the incremental processing (e.g., reconciliation report);
  B is the base data against which the incremental input is reconciled (e.g., settlement information received from payment provider).

Figure 3:
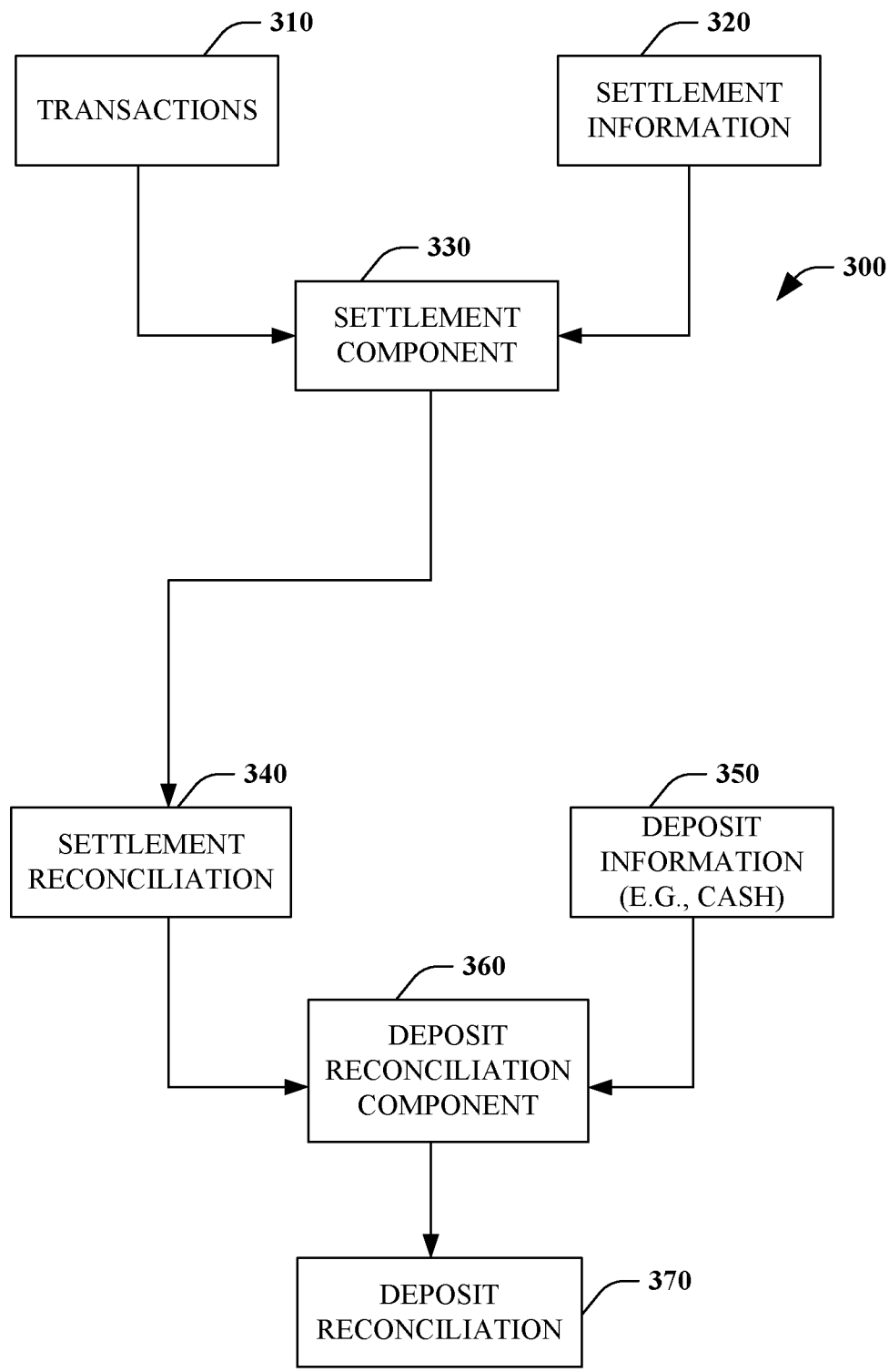
FIG. 3 is a functional block diagram of a system for reconciling financial transactions using incremental processing.

Referring to FIG. 3, a system for reconciling financial transactions using incremental processing 300 is illustrated. The system 300 includes transactions 310 and settlement information 320 which are received as inputs to a settlement component 330. For example, using a transaction identifier (e.g., merchant reference number (MRN)), the settlement component 330 can identify each unique transaction and determine which transactions have been settled based on the received settlement information 320 arriving at a settlement reconciliation 340. Initial processing of the system 300 (e.g., day 0) can be summarized in equations 2-4, as follows:

$$\Sigma TXN \times \Sigma EPA = = SR^0 + R_{TXN}^0 \quad \text{(Equation 2))}$$

$$G(SR^0) = H_{EPA} \quad \text{(Equation 3)}$$

$$\Sigma EPA - H_{EPA} = R_{EPA}^0 \quad \text{(Equation 4)}$$

Where:
  TXN is the transaction information (as viewed by the payments service);
  EPA is settlement information received from the payments provider;
  $SR^0$ is the reconciliation report;
  $R_{TXN}^0$ is the unsettled transactions remainder from the perspective of the payment service;
  $G(SR^0)$ is the incremental input of the settlement reconciliation;
  $H_{EPA}$ is the rolling history of reconciled EPA records; and
  $R_{EPA}^0$ is the unsettled transaction remainder from the perspective of the payments provider.

Thereafter, processing of the system 300 on a later day T can be summarized as follows:

$$(R_{TXN}^{T-1} + TXN^T) \times \Sigma EPA = SR^T + R_{TXN}^T \quad \text{(Equation 5)}$$

$$G(SR^T) + H_{EPA} = H_{EPA} \quad \text{(Equation 6)}$$

$$(EPA^T + R_{EPA}^{T-1}) - H_{EPA} = R_{EPA}^T \quad \text{(Equation 7)}$$

Where:
  TXN is the transaction information (as viewed by the payments service);
  $R_{TXN}^{T-1}$ is the previous unsettled transaction remainder from the perspective of the payment service;
  $TXN^T$ is the transaction information for day T from the perspective of the payment service;
  $SR^T$ is the reconciliation report as of day T from the perspective of the payment service;
  $R_{TXN}^T$ is the unsettled transactions remainder on day T from the perspective of the payment service;
  $G(SR^T)$ is the incremental input of the settlement reconciliation;
  $H_{EPA}$ is the rolling history of reconciled EPA records;
  $EPA^T$ is the settlement information received from the payments provider for day T;
  $R_{EPA}^{T-1}$ is the previous unsettled transaction remainder from the perspective of the payment provider; and
  $R_{EPA}^T$ is the unsettled transaction remainder from the perspective of the payments provider.

Based on the settlement reconciliation 340 and deposit information 350, a deposit reconciliation component 350 component can arrive at a deposit reconciliation 370.

2. Lossless Derivation in Financial Data Normalization;

From the perspective of a payment service 110, payment providers 120 provide settlement information in diverse ways. For example, some providers 120 provide settlement information at the transaction level represented as a flat data table, while other providers 120 provide settlement information periodically in a hierarchical format (e.g., transaction details are grouped by hierarchical sections). Some providers 120 provide information regarding currency conversions, and yet other providers 120 provide aggregated foreign transaction currency conversion rate(s). Some providers 120 report a gross settlement in a submission currency (e.g., used by a customer) and others provide a net settlement amount in a settlement currency (e.g., currency deposited at financial entity 130). For a globally active payment service 110, reconciling and/or generating financial reports based on the settlement information received from a plurality of providers 120 can be an ever increasingly complex problem.

Figure 4:
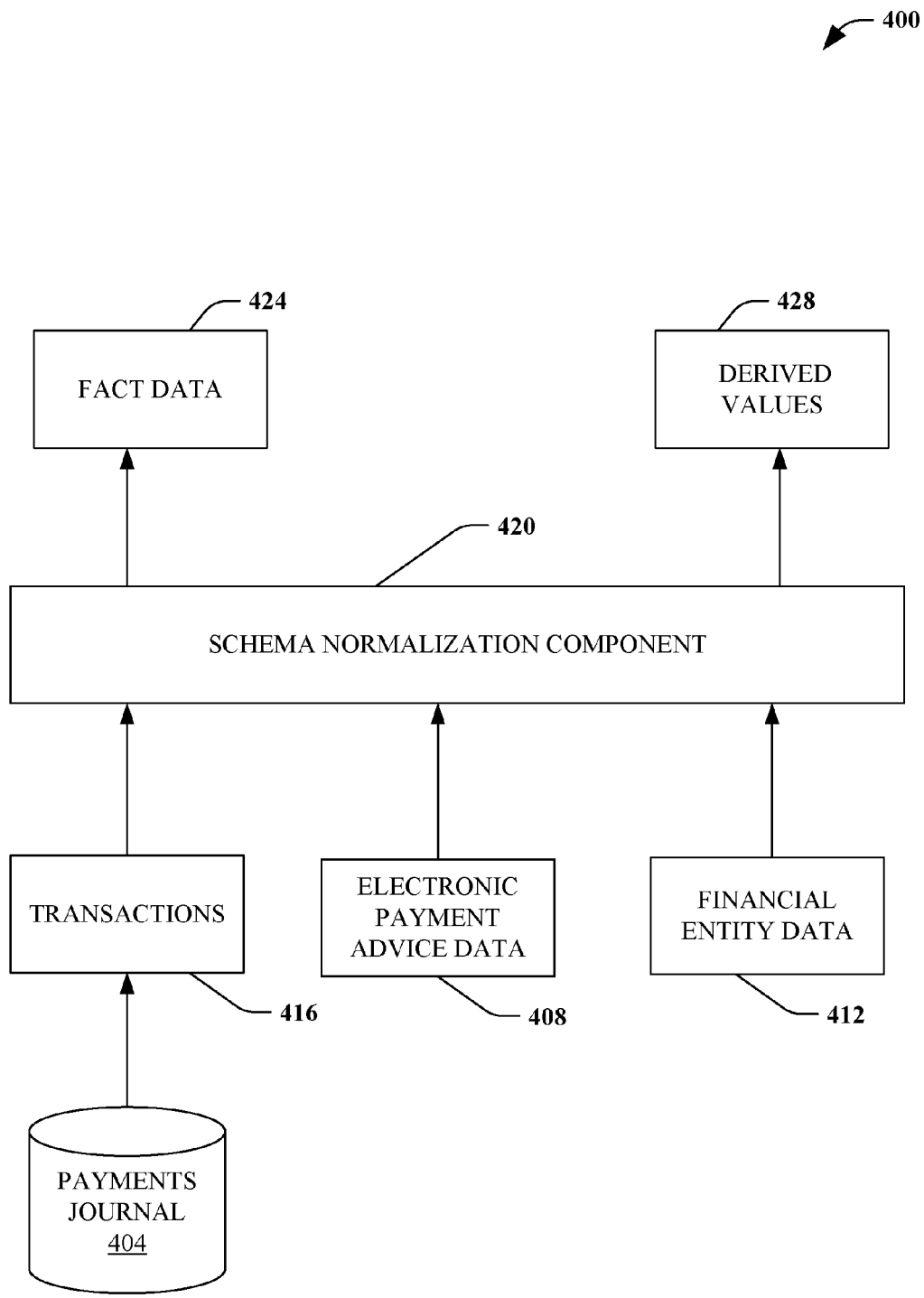
FIG. 4 is a functional block diagram of a lossless derivation in financial data normalization system.

Turning to FIG. 4, a lossless derivation in financial data normalization system 400 is illustrated. The system 400 receives transaction activities data from, for example, a payments journal 404, electronic payment advice (EPA) data from providers 408 and financial entity data from financial entity(ies) 412 (e.g., bank files). Transactions 416, based on the payments journal 404, electronic payment advice data 408 and/or financial entity data 412 is normalized by a schema normalization component 420.

In order to effectively analyze the settlement information from a plurality of diverse providers 408, the schema normalization component 420 can normalize the settlement information, for example, for reconciliation and/or reporting purposes. As EPA data (e.g., settlement information) is provided in various formats with varying information, in order to arrive at the normalized settlement information, some calculations can be performed by the schema normalization component 420. More specifically, some of the information provided in the normalized data is derived (e.g., calculated) from the received settlement information.

Normalization of received settlement information (e.g., original information) can induce discrepancies in the system 400. However, in order to track the source of these discrepancies, the system 400 can track (e.g., identify) data which was submitted, fact data 424 and data which was derived from submitted data, derived values 428.

Referring briefly to FIG. 5, a user interface 500 illustrating a settlement information record 510 comprising data which was submitted (e.g., factual data) from a payment provider 408. The submitted settlement information includes settlement currency 520, submission data 530 (e.g., transactions submitted to the payment provider), submission amount 540, submission currency 550, fee currency 560 (e.g., a fee that the payment provider charges to process the transaction) and advice meta data 570.

The settlement information record 510 further comprises data that was derived from the submitted settlement information, fee amount 580. In the example of FIG. 5, the fee amount 580 (e.g., derived data) is an unexpected amount (i.e., reported to twenty eight decimal places when two decimal places is generally a smallest unit of a transaction).

In this example, in order to facilitate tracking of discrepancies, the derived data is presented in a visually distinct manner when compared with the submitted data (e.g., bold circle encompassing derived data). Thus, a user viewing the user interface 500 can easily determine potential source(s) of the discrepancies allowing the user to focus, in this case, on the manner in which the derivation was performed.

Referring back to FIG. 4, the system 400, by tracking which data was submitted (e.g., factual data) and data which was derived from submitted data (e.g., derived data) within the normalized data, discrepancies or variances in a report can be more easily tracked to factual data (e.g., settlement information submitted by providers 408 is the cause of the discrepancies or variances) or derived data (e.g., derivation induced discrepancies or variances).

Further, by tracking which data was submitted and which data was derived, in one example, the system 400 can facilitate generation of reports based solely on submitted data. For example, when performing a settlement reconciliation between transaction information stored by a payments service and settlement information provided by a payment provider, it may be desirable to utilize only those portions of the normalized data which were settled (e.g., factual or raw data). By segregating data into different granularities (e.g., one fixed transaction-level schema and one key-value pair schema), a need for deriving data as in one relational schema case can be minimized. Yet in another example, to facilitate ease of use by a user, both submitted data and derived data can be presented. Thus, by tracking which data was submitted and which data was derived, the system 400 allows for greater flexibility in use of the data and traceability of source(s) of error(s) and/or discrepancy(ies).

3. Plug-in Model for Onboarding Additional Payment Provider(s)

As noted above, a payment service 110 can service payment activities globally. With an increasing globally presence, a need to onboard additional payment providers 120 is continually occurring. However, different payment providers 120 report financial data in different ways and it has conventionally taken a long time to establish a data processing pipeline for additional payment providers 120 at a significant business cost.

For example, establishing a provider-specific data processing pipeline is conventionally highly customized and difficult to replicate. For example, it can be difficult to maintain design consistency when on-boarding a new payment provider 120 while ensuring service quality. Further, maintenance costs associated with the data processing pipeline can be expensive. Additionally, it can be difficult to build normalized control(s) for intermediate data and processes to achieve high data quality for published data feeds from payment providers 120.

Figure 6:
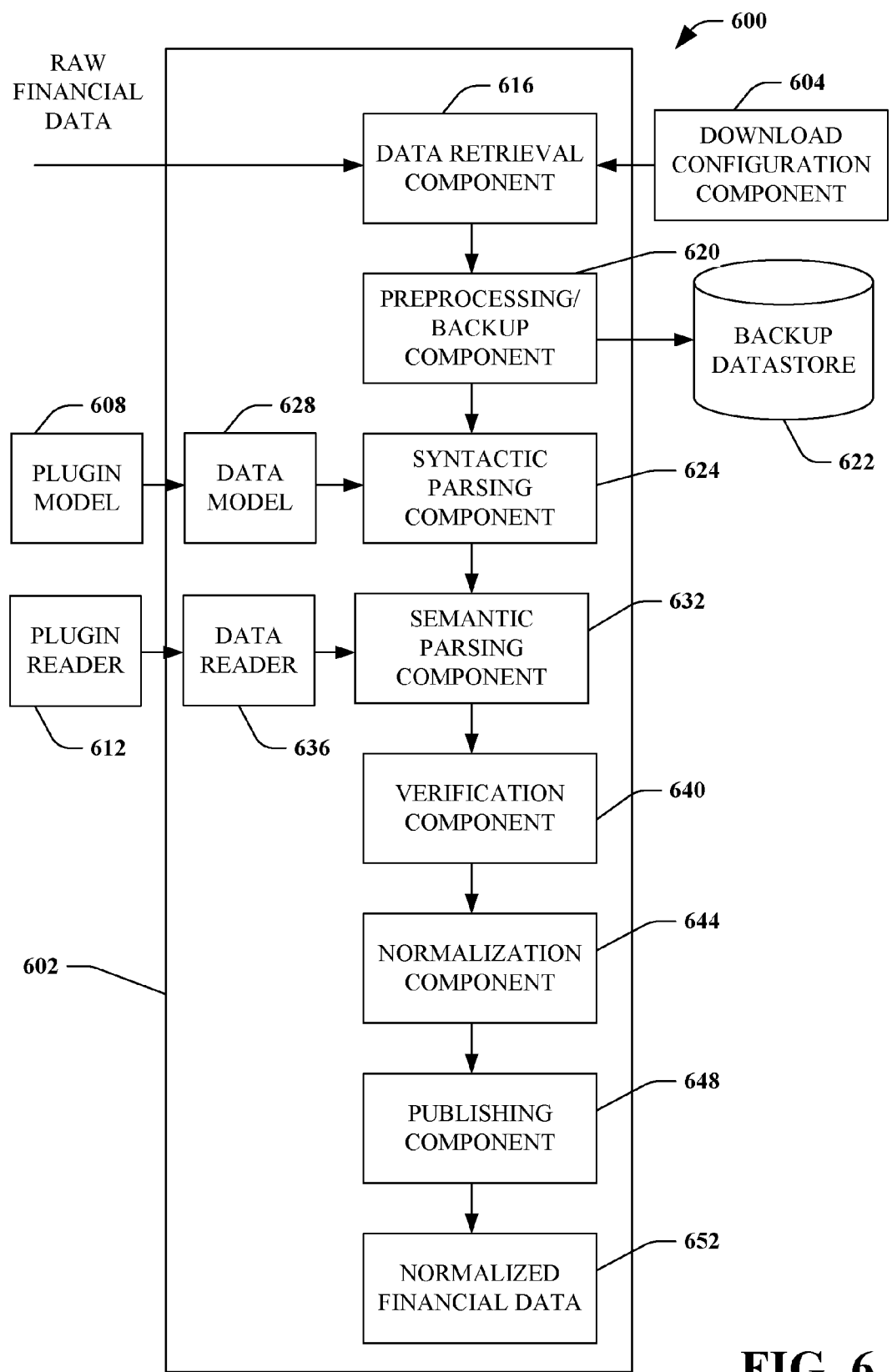
FIG. 6 is a functional block diagram of an extensible payment service system.

Turning to FIG. 6, an extensible payment service system 600 is illustrated. The system 600 can utilize a pluggable framework 602 in which, from a process viewpoint, data is normalized prior to publishing. In order to onboard an additional payment provider 120, the system 600 utilizes three payment provider specific components: a download configuration component 604, a plugin model 608 and a plugin reader 612 in conjunction with the pluggable framework 602.

The download configuration component 604 defines an endpoint by storing configuration data (e.g., configuring setting(s) and credential(s)) to facilitate a data transfer (e.g., file to be downloaded and/or REST APIs to be utilized) for a specific payment provider. For example, the download configuration component 604 can identify a service name, IP address, user name, password, port, whether a backup is required and/or whether preprocessing is required.

A data retrieval component 616 utilizes the configuration setting(s) and/or credential(s) defined in the download configuration component 604 to retrieve raw financial data (e.g., from a payment provider). The raw financial data can be provided to a preprocessing/backup component 620 that performs any preprocessing and/or backup, for example, based upon configuration data stored in the download configuration component 604. The preprocessing/backup component 620 can, for example, based upon configuration data stored in the download configuration component 604 store a backup of the retrieved raw financial data in a backup datastore 622.

The preprocessing and backup component 620 provides the preprocessed, if performed, retrieved financial data to a syntactic parsing component 624 for processing. A data structure (e.g., structural format of a retrieved file) associated with a specific payment provider is set forth in the plugin model 608. A data model 628 utilizes the payment provider-specific information stored in the plugin model 608, to inform the syntactic parsing component 624 of the data structure of data in the retrieved financial data. For example, characters 1-10 are of a particular record type (e.g., currency code, amount, etc.). The syntactic parsing component 624 interprets the data from the received financial data according to definitions in the provider specification as stored in the plugin model 608. The plugin model 608 defines a mapping from retrieved financial data (e.g., a raw provider file) to the data model 628.

Next, payment provider-specific meaning associated with a specific payment provider can be set forth in the plugin reader 612. Thus, the plugin reader 612 can utilized by a data reader 636 to inform a semantic parsing component 632 (e.g., that processes the retrieved financial data) how to understand the retrieved financial data (e.g., transaction, transaction date, transaction amount, etc.). The semantic parsing component 632 can further map the retrieved financial data into normalized types which a common set of data structures representing financial data to the extensible payment service system 600 (e.g., transaction types and settlement types).

The semantic parsing component 632 thus interprets data from provider-specified definitions to a normalized data model (e.g., lossless-derivation data structure) utilized by the system 600. The plugin reader 612 provides a mapping from each provider data model to the normalized data model for general reconciliation.

The retrieved financial data can be verified by a verification component 640 and normalized by a normalization component 644 (e.g., as discussed previously). Thereafter, the verified, normalized financial data can be published by a publishing component 648 for use, for example, for reconciliation, reporting, financial adjustments, chargebacks and the like.

4. Map-Reduce for Point-in-Time Report Generation

A Point-In-Time report (PIT) represents an historical view of account/transaction balances of financial clearing(s) for at a particular point in time (e.g., balance as of a particular day). For example, the PIT report can enable adjustment and/or verification of financial bookings and/or revenues.

The balance for a certain account/transaction on day T is calculated by:

$$\text{Balance}(T)=\text{Balance}(T-1)+\text{CreditActivity}(T)-\text{DebitActivity}(T) \quad \text{(Equation 8)}$$

$$\text{Age}(T)=\text{Age}(T-1)+1 \text{ or } 0 \text{ if cleared} \quad \text{(Equation 9)}$$

In order to generate a PIT report for any arbitrary date, a conventional method is to backtrack all account/transaction balances throughout the history. This conventional method is highly inefficient and cannot be used to create timely financial report(s) and/or adjustment(s).

Figure 7:
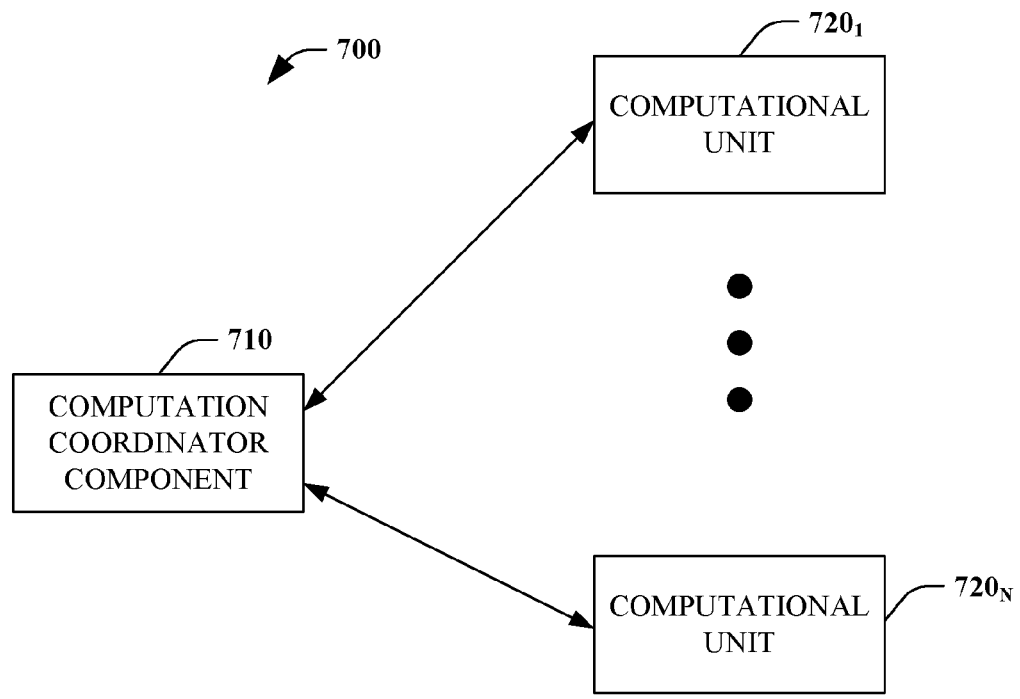
FIG. 7 is a functional block diagram of a distributed computation platform.

Referring to FIG. 7, a distributed computation platform 700 is illustrated. Using the system 700, a computation coordinator component 710 maps financial activity(ies) to a plurality of computational units 720 (e.g., distributed computational units). For example, the computation coordinator component 710 can map each account/transaction to a different computational unit 720. Each computation unit 720 can utilized dynamic programming to derive a balance, for example, for each particular point in time (e.g., day) from a first point in time (e.g., first day) onwards. After the computational units 720 finish the computation for the mapped data, a result can be reduced into a single dataset, which is the PIT report.

Figure 8:
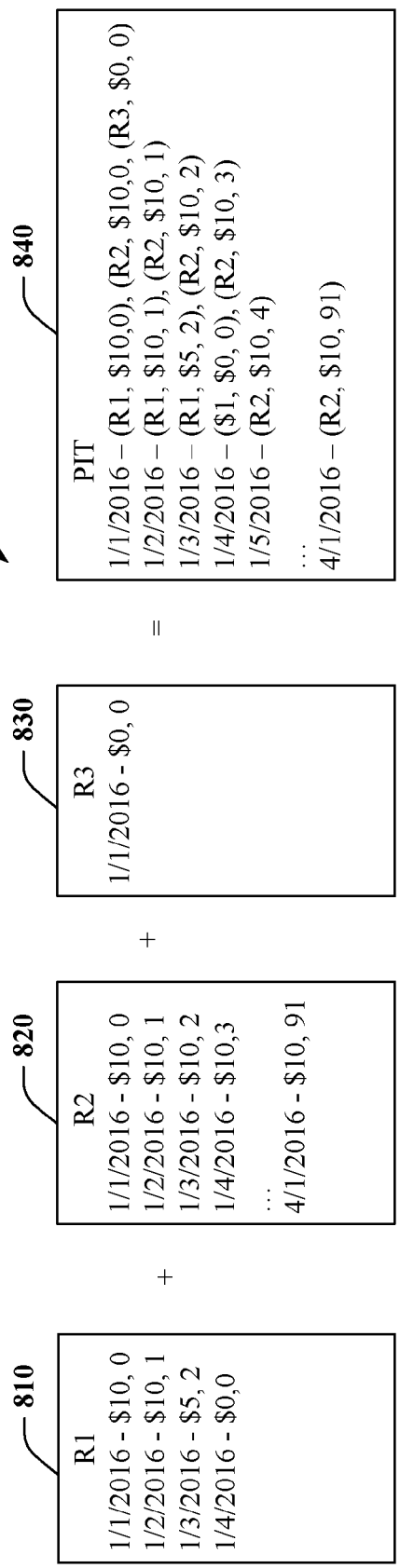
FIG. 8 is a diagram of an exemplary account/transaction computation process.

Turning to FIG. 8, an exemplary account/transaction computation process is illustrated. This simplified example, includes three accounts/transactions R1 810, R2 820 and R3

830. For purposes of explanation, each row of the three accounts/transactions R1 810, R2 820 and R3 830 reflects an account date, a balance and an age.

Processing for each of the three accounts/transactions can be performed, for example, by a particular computation unit 720. A PIT report 840 is the summation of a balance for each of the three accounts/transactions on a particular point in time (e.g., day) of interest. For example, the PIT report 840 for Apr. 1, 2016 indicates a result of (R2, $10, 91). The summation can be performed, for example, by the computation coordinator component 710.

5. Versioning in Continuous Delivery of Financial Data

In order to ensure accuracy, financial data needs to be audited; however, published data feeds cannot be changed arbitrarily. The financial data received from payment provider(s) can be inaccurate. In this case, for auditing purposes, for example, old data (e.g., prior to correction) needs to be traced even after correction. Further, for example, for auditing purposes, original data and corrected data is preserved for a certain period of time.

Financial data flows through a reconciliation pipeline in streams which feed data consumers without registration. When correction(s) occur, consumers need to be notified of the availability of corrected data. However, a simple data feed model does not support a pull notification. Also, regular data still need to be continuously delivered even when a correction takes place.

Figure 9:
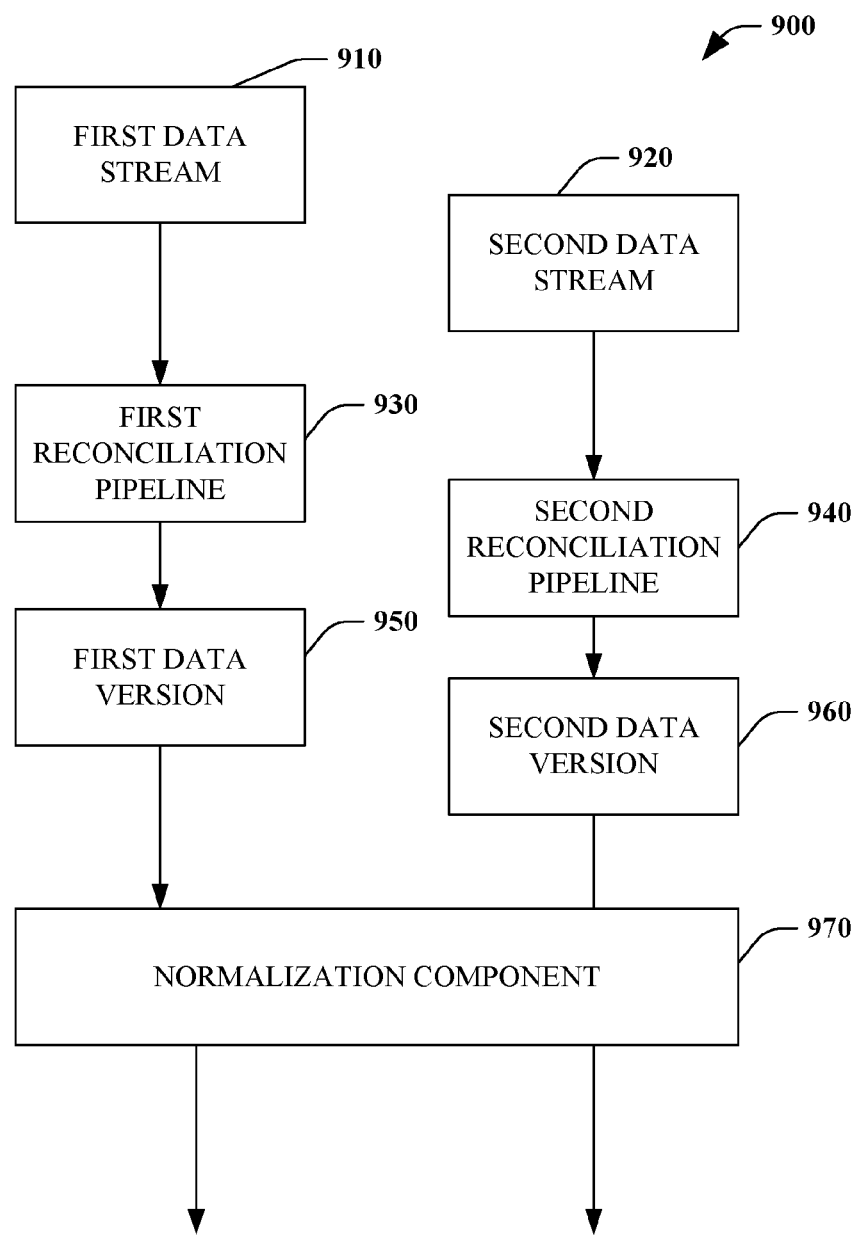
FIG. 9 is a functional block diagram of a versioning in continuous delivery of financial data system.

Referring to FIG. 9, a versioning in continuous delivery of financial data system 900 is illustrated. In the system 900, a first data stream 910 comprising original submitted data and a second data stream 920 comprising corrected submitted data are streamed in reconciliation pipelines 930, 940, respectively. Data from these reconciliation pipelines 930, 940 are maintained in a first data version 950 and a second data version 960, respectively.

The first data version 950 and the second data version 960 are normalized by a normalization component 9970 and available for consumption by various data consumers, for example, reconciliation, reporting, financial adjustments, chargebacks, etc. In one example, a latest value of data record(s) is reported to the data consumers. Further, the data consumers are notified of changes to particular record(s). For example, if a transaction is originally reported as settled at $100 in the first data version 950, but is reported as settled at $101 in the second data version 960, consumer(s) of this particular record can be notified of the change (+$1) as well as the latest version of the data being made available to consumer(s).

In this manner, no manual intervention is needed to update consumer(s) of the particular record, since consumer(s) of the particular record are notified of the value of the change.

Figure 10:
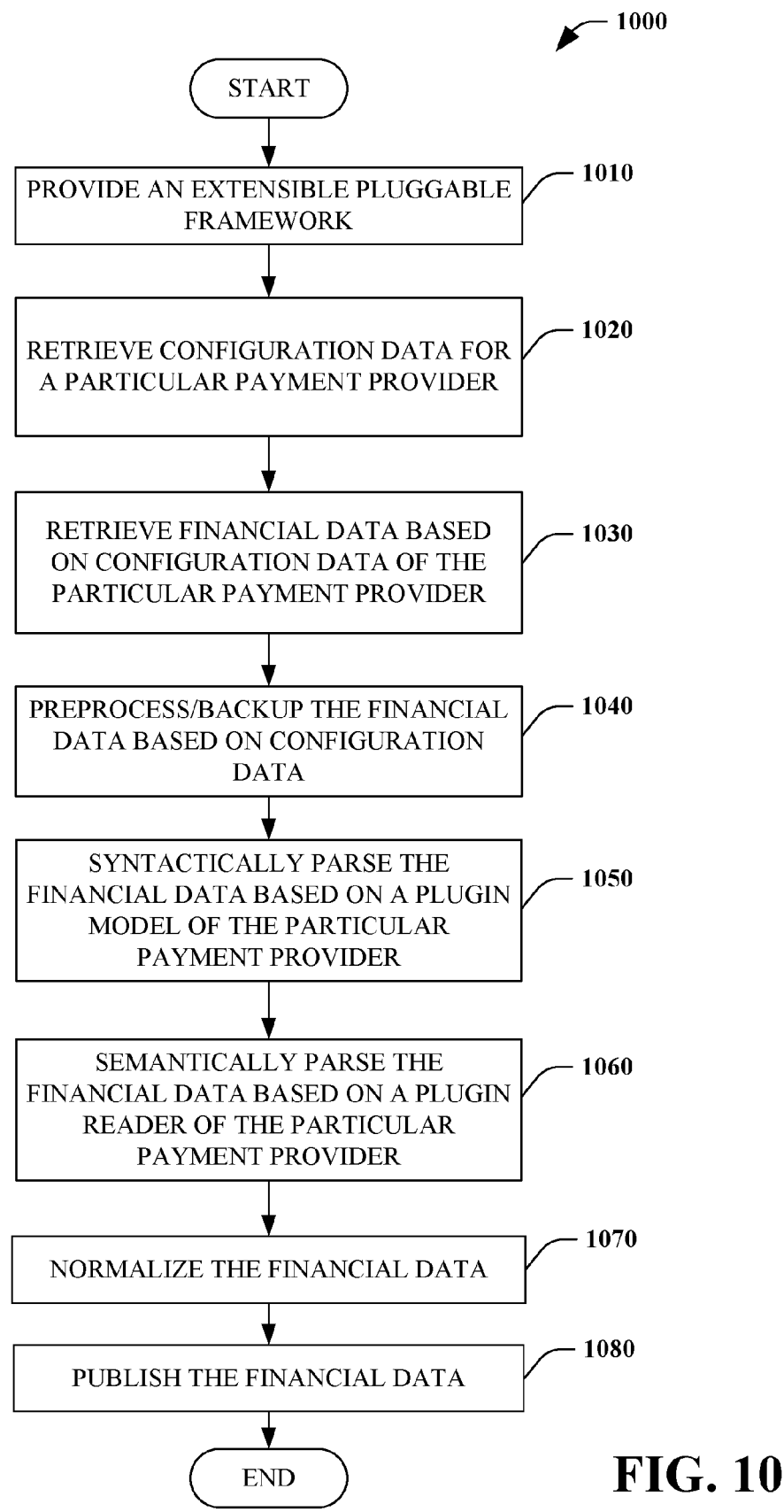
FIG. 10 illustrates an exemplary methodology of a method of processing financial data for a particular payment provider.
Figure 11:
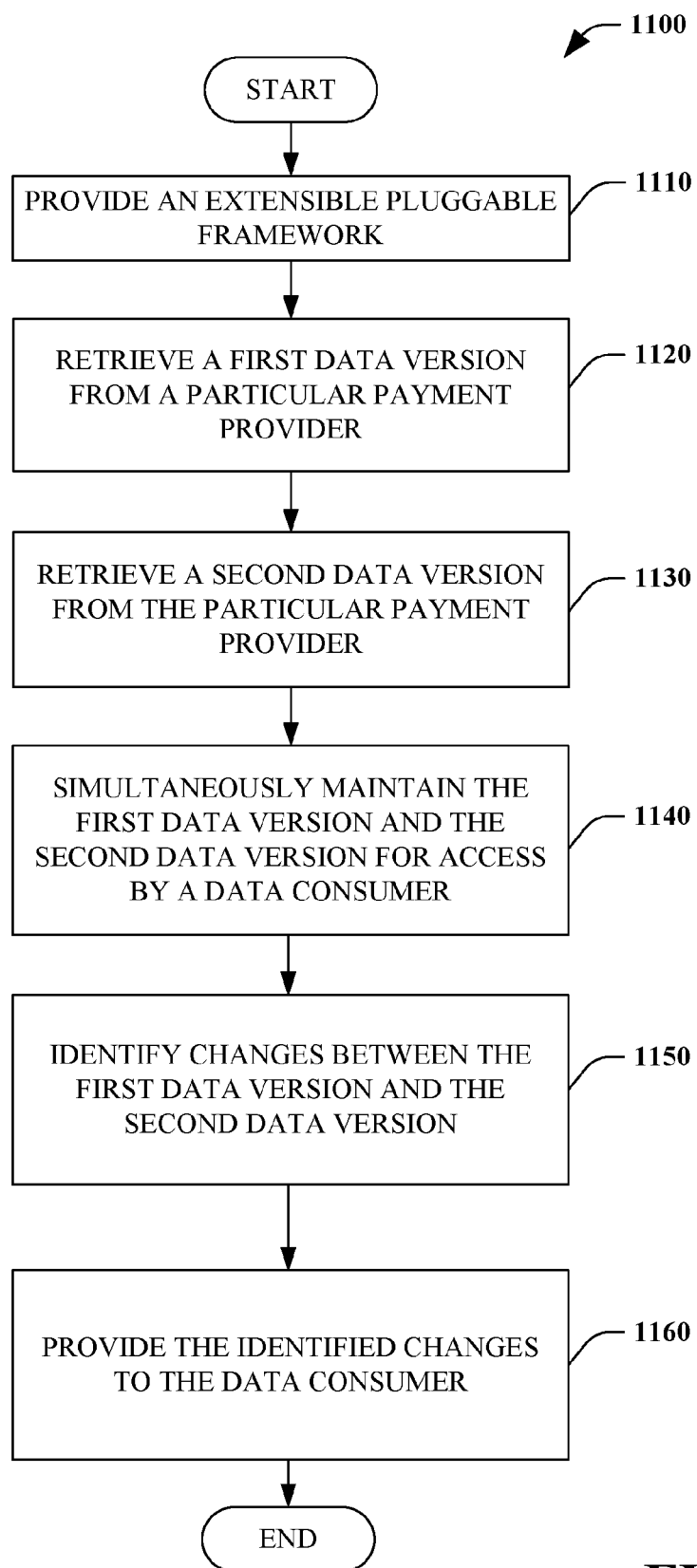
FIG. 11 illustrates an exemplary methodology of a method of versioning in continuous delivery of financial data.

FIGS. 10 and 11 illustrate exemplary methodologies relating to utilizing a pluggable framework to process financial data and versioning in continuous delivery of financial data, respectively. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 10, a method of processing financial data for a particular payment provider is illustrated. At 1010, an extensible pluggable framework is provided (e.g., pluggable framework 602). The extensible pluggable framework, from a process viewpoint, normalizes financial data prior to publishing. In order to onboard a particular payment provider, the framework utilizes configuration data, a plugin model of the particular payment provider, and, a plugin reader of the particular model.

The configuration data can include, for example, setting(s) and/or credential(s) to facilitate a data transfer (e.g., file to be downloaded and/or REST APIs to be utilized) for the particular payment provider. For example, the download configuration component 604 can identify a service name, IP address, user name, password, port, whether a backup is required and/or whether post processing is required.

A data model of the framework utilizes the payment provider-specific information stored in the plugin model to perform syntactic parsing of the data structure of the retrieved financial data. A data reader of the framework utilizes the plugin reader to semantically parse the retrieved financial data.

At 1020, configuration data is retrieved for the particular payment provider. At 1030, financial data is retrieved based on configuration data of the particular payment provider. At 1040, based on the configuration data, preprocessing and/or backup is performed on the financial data.

At 1050, based on the plugin model of the particular payment provider, the financial data is syntactically parsed. At 1060, based on the plugin reader of the particular payment provider, the financial data is semantically parsed. At 1070, the financial data is normalized. At 1080, the financial data is published.

Turning next to FIG. 11, a method of versioning in continuous delivery of financial data 1100 is illustrated. At 1110, an extensible pluggable framework is provided (e.g., pluggable framework 602). The extensible pluggable framework, from a process viewpoint, normalizes financial data prior to publishing. In order to onboard a particular payment provider, the framework utilizes configuration data, a plugin model of the particular payment provider, and, a plugin reader of the particular model, as discussed above.

At 1120, a first data version is retrieved from a particular payment provider (e.g., based on the method of FIG. 10). At 1130, a second data version is retrieved from the particular provider (e.g., based on the method of FIG. 10).

At 1140, the first data version and the second data version are simultaneously maintained for access by a data consumer. At 1150, changes between the first data version and the second data version are identified. At 1160, the identified changes are provided to the data consumer.

Described herein is a system for reconciling financial transactions using incremental processing including a computer comprising a processor and a memory. The memory includes computer-executable instructions that when executed cause the processor to perform an incremental process including receiving incremental changes of transaction information retained by a payment service, and, utilizing a remainder of a previous incremental reconciliation process, if any, processing the received incremental changes against a base data comprising settlement information received from a payment provider by identifying settled transactions and a new remainder of the previous incremental reconciliation process.

The system can include wherein the remainder of the previous incremental reconciliation process is set to null before a first iteration of the incremental process. The system can include wherein the incremental process is iteratively performed on a periodic basis.

The system can further include wherein the identified settled transactions are utilized to perform a deposit reconciliation by a deposit reconciliation component. The system can include wherein the new remainder comprises a plurality of unsettled transactions.

Described herein is an extensible payment service system including a download configuration component configured to store configuration data to be used for retrieving raw financial data from a particular payment provider. The system can further include a plugin model configured to provide information to a pluggable framework of a data structure of the retrieved financial data from the particular payment provider. The system can further include a plugin reader configured to provide information to the pluggable framework of semantic meaning of the retrieved financial data from the particular payment provider. The system can include the pluggable framework configured to retrieve the financial data from the particular payment provider based on the stored configuration data, process the retrieved financial data by syntactically parsing the retrieved financial data based on the plugin model, and, process the retrieved financial data by semantically parsing the retrieved financial data based on the plugin read.

The system can include a normalization component configured to normalize the financial data after the financial data has been syntactically parsed and semantically parsed. The system can include wherein the normalized financial data comprises financial data as retrieved and data derived from retrieved data. The system can include wherein the financial data as retrieved is separately identifiable from the data derived from retrieved data with the normalized financial data. The system can include a preprocessing/backup component configured to preprocess the retrieved financial data based upon configuration data stored by the download configuration component for the particular payment provider.

The system can include a preprocessing/backup component configured to backup the retrieved financial data based upon configuration data stored by the download configuration component for the particular payment provider. The system can include a publishing component configured to publish the financial data after the financial data has been syntactically parsed and semantically parsed. The system can include wherein the financial data comprises settlement information and the pluggable framework is further configured to utilize incremental processing to reconcile the settlement information with stored transaction information. The system can include, wherein the incremental processing comprises: receiving incremental changes of transaction information retained by a payment service; and utilizing a remainder of a previous incremental reconciliation process, if any, processing the received incremental changes against a base data comprising settlement information received from a payment provider by identifying settled transactions and a new remainder of the previous incremental reconciliation process.

The system can include wherein the pluggable framework is configured to retrieve a first data version from the particular payment provider, maintain the first data version, retrieve a second data version from the particular payment provider, maintain the second version, the first data version and the second data version being simultaneously maintained and accessible by a data consumer, the pluggable framework identifying changes between the first data version and the second data version and provide the identified changes to the data consumer.

Described herein is a method including retrieving financial data from a particular payment provider based on stored configuration data associated with the particular payment provider. The method can further include syntactically parse the retrieved financial data based on a plugin model of the particular payment provider. The method can further include semantically parse the retrieved financial data based on a plugin reader of the particular payment provider, wherein the plugin model is configured to provide information of a data structure of the retrieved financial data from the particular payment provider, and, the plugin reader is configured to provide information of semantic meaning of the retrieved financial data from the particular payment provider.

The method can include normalizing the syntactically parsed and semantically parsed financial data, wherein the normalized financial data comprises financial data as retrieved and data derived from retrieved data. The method can include wherein the financial data as retrieved is separately identifiable from the data derived from retrieved data with the normalized financial data. The method can further include preprocessing the retrieved financial data based upon the configuration data of the particular payment provider. The method can further include publishing the financial data after the financial data has been syntactically parsed and semantically parsed.

Figure 12:
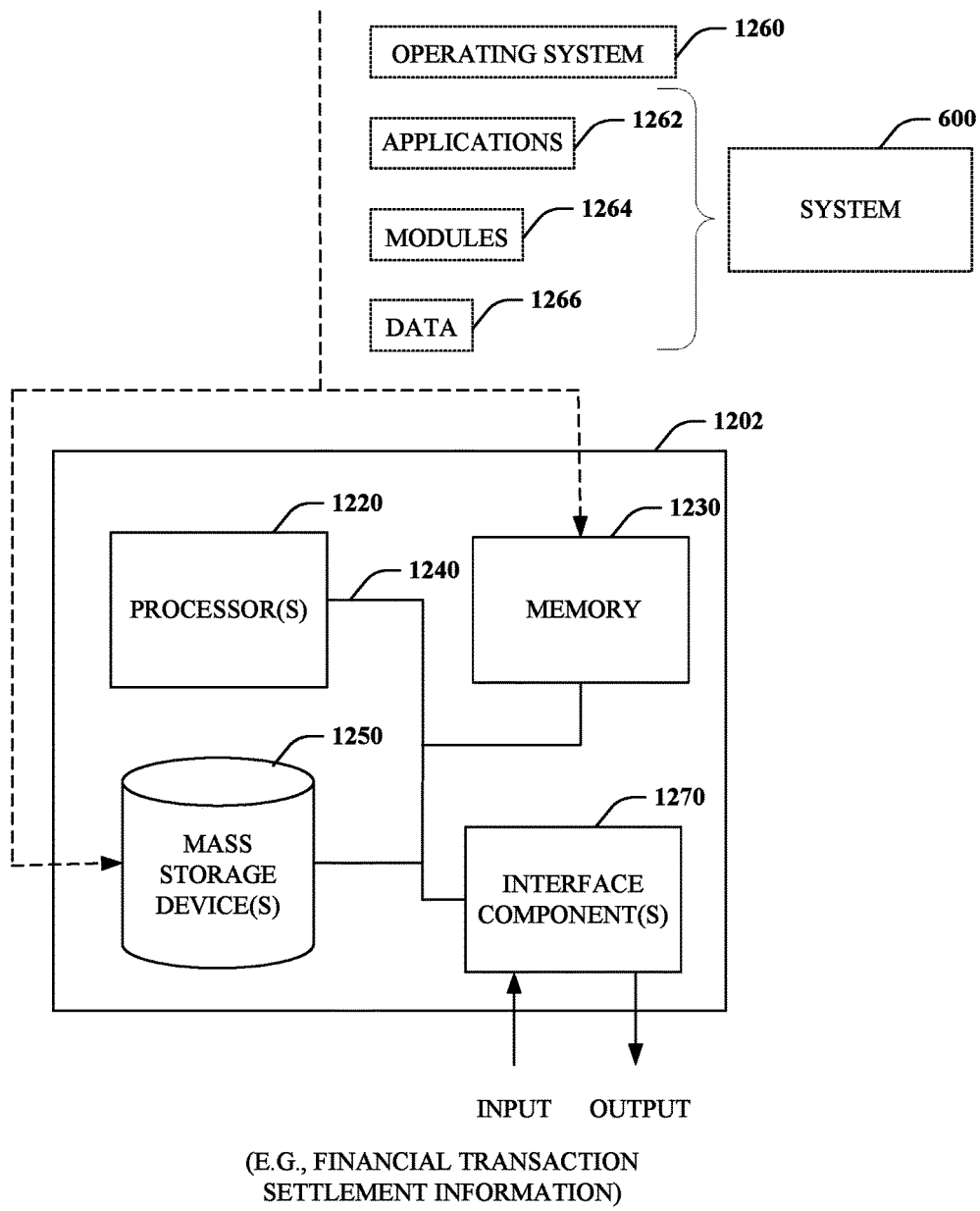
FIG. 12 is a functional block diagram that illustrates an exemplary computing system.

With reference to FIG. 12, illustrated is an example general-purpose computer or computing device 1202 (e.g., desktop, laptop, tablet, watch, server, hand-held, programmable consumer or industrial electronics, set-top box, game system, compute node, etc.). For instance, the computing device 1202 may be used in an extensible payment service system.

The computer 1202 includes one or more processor(s) 1220, memory 1230, system bus 1240, mass storage device(s) 1250, and one or more interface components 1270. The system bus 1240 communicatively couples at least the above system constituents. However, it is to be appreciated that in its simplest form the computer 1202 can include one or more processors 1220 coupled to memory 1230 that execute various computer executable actions, instructions, and or components stored in memory 1230. The instructions may be, for instance, instructions for implementing functionality described as being carried out by one or more components discussed above or instructions for implementing one or more of the methods described above.

The processor(s) 1220 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1220 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 1220 can be a graphics processor.

The computer 1202 can include or otherwise interact with a variety of computer-readable media to facilitate control of the computer 1202 to implement one or more aspects of the claimed subject matter. The computer-readable media can be any available media that can be accessed by the computer 1202 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 1202. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 1230 and mass storage device(s) 1250 are examples of computer-readable storage media. Depending on the exact configuration and type of computing device, memory 1230 may be volatile (e.g., RAM), non-volatile (e.g., ROM, flash memory, etc.) or some combination of the two. By way of example, the basic input/output system (BIOS), including basic routines to transfer information between elements within the computer 1202, such as during start-up, can be stored in nonvolatile memory, while volatile memory can act as external cache memory to facilitate processing by the processor(s) 1220, among other things.

Mass storage device(s) 1250 includes removable/non-removable, volatile/non-volatile computer storage media for storage of large amounts of data relative to the memory 1230. For example, mass storage device(s) 1250 includes, but is not limited to, one or more devices such as a magnetic or optical disk drive, floppy disk drive, flash memory, solid-state drive, or memory stick.

Memory 1230 and mass storage device(s) 1250 can include, or have stored therein, operating system 1260, one or more applications 1262, one or more program modules 1264, and data 1266. The operating system 1260 acts to control and allocate resources of the computer 1202. Applications 1262 include one or both of system and application software and can exploit management of resources by the operating system 1260 through program modules 1264 and data 1266 stored in memory 1230 and/or mass storage device(s) 1250 to perform one or more actions. Accordingly, applications 1262 can turn a general-purpose computer 1202 into a specialized machine in accordance with the logic provided thereby. In one example, application 1262 includes key service component 160.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 1262, and include one or more modules 1264 and data 1266 stored in memory and/or mass storage device(s) 1250 whose functionality can be realized when executed by one or more processor(s) 1220.

In accordance with one particular embodiment, the processor(s) 1220 can correspond to a system on a chip (SOC) or like architecture including, or in other words integrating, both hardware and software on a single integrated circuit substrate. Here, the processor(s) 1220 can include one or more processors as well as memory at least similar to processor(s) 1220 and memory 1230, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 1202 also includes one or more interface components 1270 that are communicatively coupled to the system bus 1240 and facilitate interaction with the computer 1202. By way of example, the interface component 1270 can be a port (e.g., serial, parallel, PCMCIA, USB, FireWire, etc.) or an interface card (e.g., sound, video, etc.) or the like. In one example implementation, the interface component 1270 can be embodied as a user input/output interface to enable a user to enter commands and information into the computer 1202, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 1270 can be embodied as an output peripheral interface to supply output to displays (e.g., LCD, LED, plasma, etc.), speakers, printers, and/or other computers, among other things. Still further yet, the interface component 1270 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system for reconciling financial transactions using incremental processing, comprising:
   a computer comprising a processor and a memory, the memory comprising computer-executable instructions that when executed cause the processor to perform an incremental process comprising:
   receiving incremental changes of transaction information retained by a payment service;
   receiving base data comprising settlement information from a payment provider, the settlement information comprising fact data stored according to a provider-specified definition;
   mapping the received settlement information into a normalized format of a common set of data structures;
   calculating derived data from the fact data;
   adding the derived data to the normalized settlement information;
   tracking the fact data from the derived data;
   utilizing a remainder of a previous incremental reconciliation process, if any, processing the received incremental changes against the base data comprising the normalized settlement information of the payment provider by identifying settled transactions and a new remainder of the previous incremental reconciliation process; and
   via a user interface presented on a display of the computer, displaying at least some of the normalized settlement information including the derived data presented in a visually distinct manner from the fact data.

2. The system of claim 1, wherein the remainder of the previous incremental reconciliation process is set to null before a first iteration of the incremental process.

3. The system of claim 1, wherein the incremental process is iteratively performed on a periodic basis.

4. The system of claim 1, wherein the identified settled transactions are utilized to perform a deposit reconciliation by a deposit reconciliation component.

5. The system of claim 1, wherein the new remainder comprises a plurality of unsettled transactions.

6. The system of claim 1, wherein the transaction information comprises information regarding credit card transactions.

7. The system of claim 1, wherein the settlement information comprises information regarding a foreign currency in which a particular transaction was settled, and, an exchange rate utilized for the particular transaction.

8. A method of reconciling financial transactions using incremental processing, comprising:
   receiving incremental changes of transaction information retained by a payment service;
   receiving base data comprising settlement information from a payment provider, the settlement information comprising fact data stored according to a provider-specified definition;
   mapping the received settlement information into a normalized format of a common set of data structures;
   calculating derived data from the fact data;
   adding the derived data to the normalized settlement information;
   tracking the fact data from the derived data;
   utilizing a remainder of a previous incremental reconciliation process, if any, processing the received incremental changes against the base data comprising the normalized settlement information of the payment provider by identifying settled transactions and a new remainder of the previous incremental reconciliation process; and
   via a user interface presented on a display of the computer, displaying at least some of the normalized settlement information including the derived data presented in a visually distinct manner from the fact data.

9. The method of claim 8, wherein the remainder of the previous incremental reconciliation process is set to null before a first iteration of the incremental process.

10. The method of claim 8, wherein the incremental process is iteratively performed on a periodic basis.

11. The method of claim 8, wherein the identified settled transactions are utilized to perform a deposit reconciliation by a deposit reconciliation component.

12. The method of claim 8, wherein the new remainder comprises a plurality of unsettled transactions.

13. The method of claim 8, wherein the transaction information comprises information regarding credit card transactions.

14. The method of claim 8, wherein the settlement information comprises information regarding a foreign currency in which a particular transaction was settled, and, an exchange rate utilized for the particular transaction.

15. A computer storage medium storing computer-readable instructions that when executed cause a computer to:
   receive incremental changes of transaction information retained by a payment service;
   receive base data comprising settlement information from a payment provider, the settlement information comprising fact data stored according to a provider-specified definition;
   map the received settlement information into a normalized format of a common set of data structures;
   calculate derived data from the fact data; add the derived data to the normalized settlement information; track the fact data from the derived data; utilize a remainder of a previous incremental reconciliation process, if any, processing the received incremental changes against the base data comprising the normalized settlement information of the payment provider by identifying settled transactions and a new remainder of the previous incremental reconciliation process; and via a user interface presented on a display of the computer, display at least some of the normalized settlement information including the derived data presented in a visually distinct manner from the fact data.

16. The computer storage medium of claim 15, wherein the remainder of the previous incremental reconciliation process is set to null before a first iteration of the incremental process.

17. The computer storage medium of claim 15, wherein the incremental process is iteratively performed on a periodic basis.

18. The computer storage medium of claim 15, wherein the identified settled transactions are utilized to perform a deposit reconciliation by a deposit reconciliation component.

19. The computer storage medium of claim 15, wherein the new remainder comprises a plurality of unsettled transactions.

20. The computer storage medium of claim 15, wherein the transaction information comprises information regarding credit card transactions.

* * * * *